Figure 2:
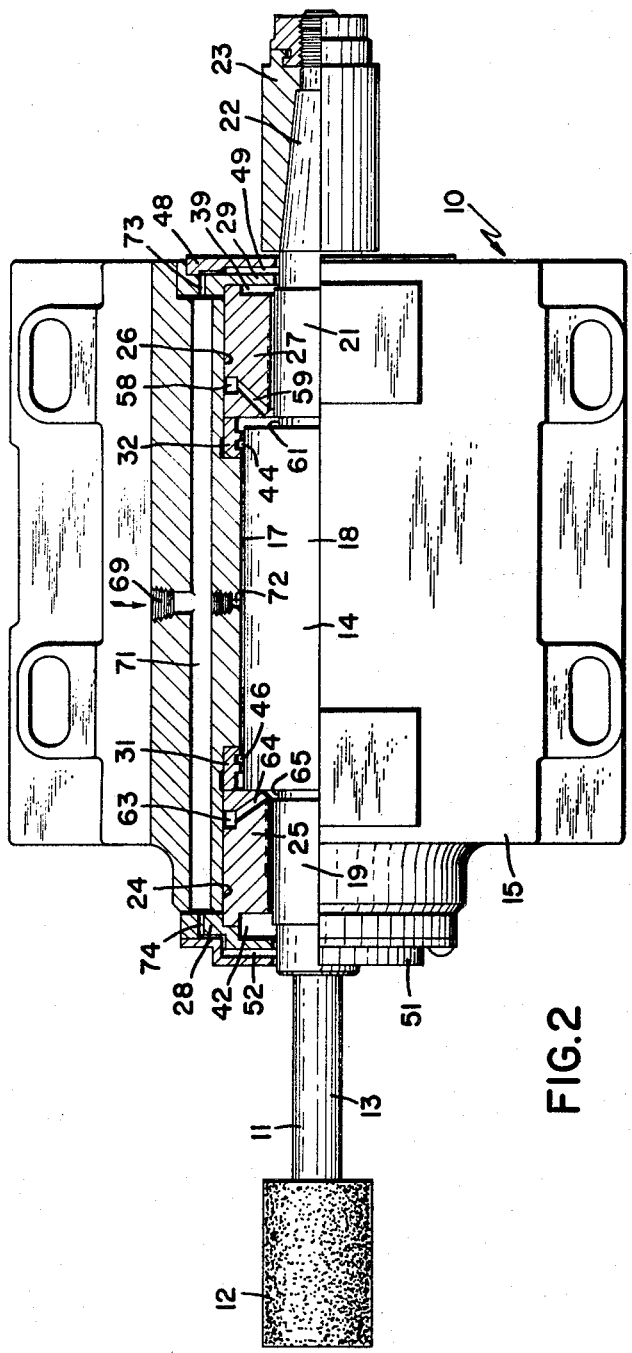

June 11, 1968
R. S. HAHN ET AL
3,387,899
BEARING
Filed Aug. 17, 1966
3 Sheets-Sheet 1
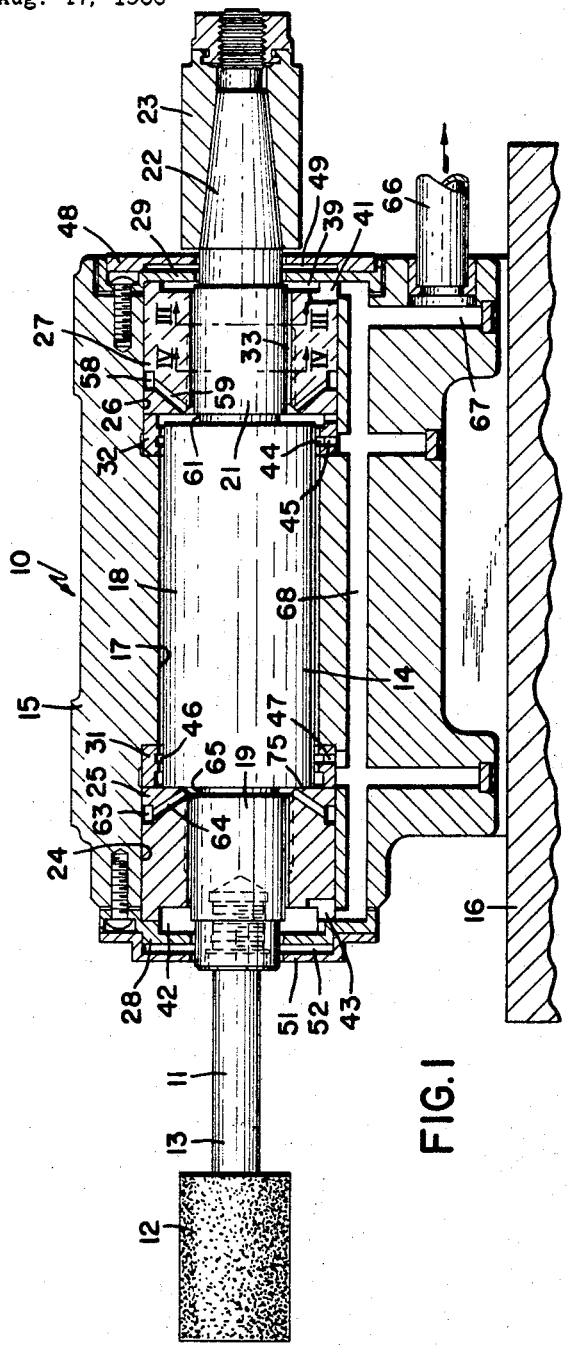
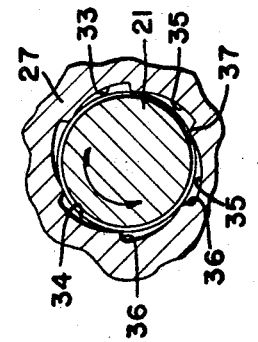
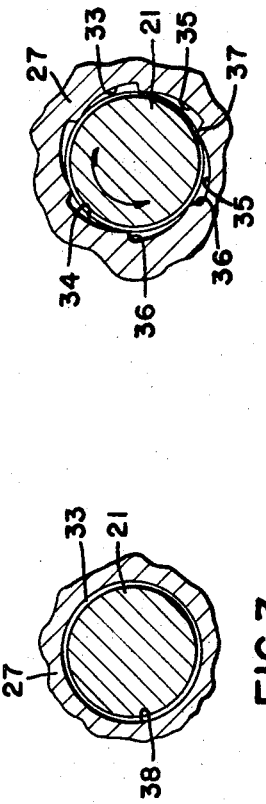
INVENTORS
Robert S. Hahn
David H. Youden
BY
*Norman S. Blodgett*
ATTORNEY United States Patent Office 3,387,899
Patented June 11, 1968

3,387,899
BEARING
Robert S. Hahn, Northboro, and David H. Youden, Worcester, Mass., assignors to The Heald Machine Company, Worcester, Mass., a corporation of Delaware
Filed Aug. 17, 1966, Ser. No. 573,025
8 Claims. (Cl. 308—77)

This invention relates to a bearing and, more particularly, to apparatus for supporting a spindle for high-speed rotation.

There are many instances in modern industry where the need is felt for a spindle capable of rotating at very high speeds. A typical example is in the spindle supporting the abrasive wheel of an internal grinding machine. There is an optimum surface speed between the grinding abrasive wheel and the surface of the workpiece to be finished. It is obvious that, in the case of a very small workpiece, such as the race of a miniature ball bearing, the abrasive wheel must have a very small diameter. With such a small diameter wheel, the only way to attain the optimum surface speed is to use a high speed of rotation of the spindle carrying the abrasive wheel. Suitable bearings for such a high-speed spindle have in the past been very expensive and have not been entirely satisfactory. Very high speeds say, over 100,000 r.p.m., are prone to failure of lubrication and to the generation of considerable amounts of heat. Failure of lubrication and the generation of large amounts of heat leads to short life for the bearing. While suitable bearings have been constructed, nevertheless, in the past, such bearings have been very complicated and expensive, have required extensive maintenance procedures, and have been far from satisfactory in many other ways. These and other difficulties experienced with the prior art devices have been obviated in a novel manner by the present invention.

It is, therefore, an outstanding object of the invention to provide a bearing in cooperation with a high-speed spindle, which apparatus is simple in construction, which is inexpensive to manufacture, and which is capable of a long life of useful service with a minimum of maintenance.

Another object of this invention is the provision of a high-speed spindle arrangement in which the heat generated is reduced to a minimum.

A further object of the present invention is the provision of a grinding machine wheelhead capable of high-speed rotation and having long bearing life with a minimum of maintenance.

It is another object of the instant invention to provide a bearing which combines the features of hydrostatic and hydrodynamic lubrication.

It is a further object of the invention to provide a bearing of high stiffness which is capable of operating at high speed without the necessity for an expensive lubrication supply system and without large power losses in the bearing.

A still further object of this invention is the provision of a wheelhead for a grinding machine whose spindle is capable of receiving radial forces without substantial movement in the direction of the forces.

It is a still further object of the present invention to provide a wheelhead having an extremely stiff spindle and being capable of high-speed operation without the necessity of a large lubricant supply.

With these and other objects in view, as will be apparent to those skilled in the art, the invention resides in the combination of parts set forth in the specification and covered by the claims appended hereto.

Figure 5:
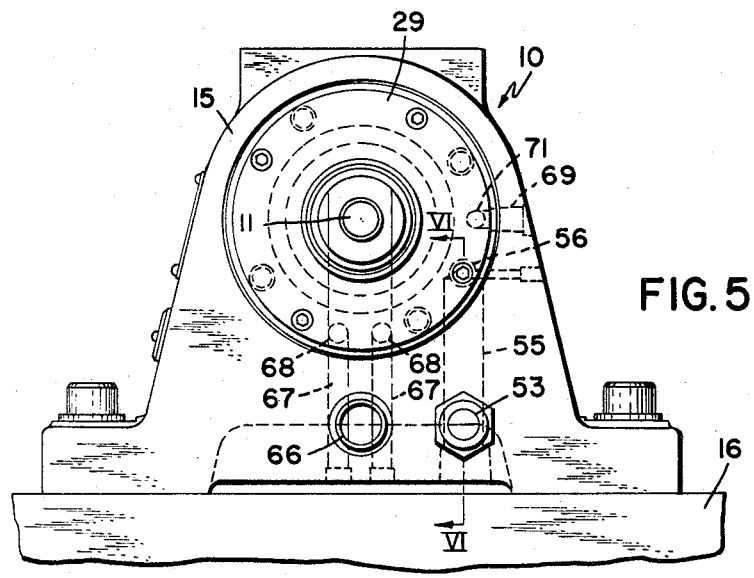
Figure 6:
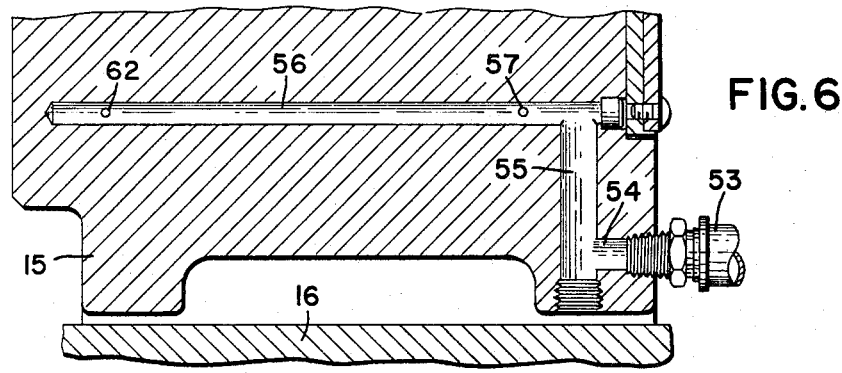

The character of the invention, however, may be best understood by reference to one of its structural forms, as illustrated by the accompanying drawings in which:

FIG. 1 is a vertical sectional view of a wheelhead embodying the principles of the present invention, FIG. 2 is a plan view of the wheelhead with portions broken away, FIG. 3 is a sectional view of the wheelhead taken on the line III—III of FIG. 1, FIG. 4 is a vertical sectional view of the invention taken on the line IV—IV of FIG. 1, FIG. 5 is an end view of the wheelhead, and FIG. 6 is a sectional view of the wheelhead taken on the line VI—VI of FIG. 5.

Referring first to FIGS. 1 and 2, which best show the general features of the invention, the wheelhead, indicated generally by the reference numeral 10, is shown as carrying a spindle 11 at the outer end of which is mounted an abrasive wheel 12. It will be understood that the showing of the invention as a wheelhead carrying an abrasive wheel is for the purpose of illustration only and not an indication that this is the only use for the concept. It is clear from the drawings that the spindle is made up of an outer portion 13 which carries the abrasive wheel and which is threadedly connected to a main portion 14 which lies within the wheelhead. Surrounding and supporting the main portion 14 is a housing 15 provided with suitable legs for mounting on a supporting surface 16. The housing is of generally cylindrical shape with its axis in the same general position as the axis of the main portion 14 of the spindle and is provided with a concentric bore 17 through which the spindle passes.

The main portion 14 of the spindle 11 is formed of one piece of metal and has a large cylindrical center portion 18. At the end adjacent the abrasive wheel the main portion 14 is provided with a reduced portion 19; at the other end it is provided with a reduced portion 21 which, in turn, is provided with a conical portion 22 on which is mounted a pulley 23 suitably locked in place by means of the usual keys and nut. Entering the end of the housing occupied by the reduced portion 19 of the spindle is a counterbore 24 in which is mounted a generally cylindrical bearing block 25. A similar counterbore 26 is formed in the other end of the housing adjacent the pulley 23 and is occupied by a bearing block 27. Mounted on the end of the housing 15 adjacent the abrasive wheel 12 and having an aperture for the exit of the spindle 11 is a seal plate 28 held in place by screws. At the other end of the housing is fastened a seal plate 29 similarly fastened in place by screws. Lying in the bottom of the counterbore 24 and held in place by the bearing block 25 is a collector ring 31, while a similar collector ring 32 is held in the bottom of the counterbore 26 and held in place by the bearing block 27.

Extending axially through the bearing block 27 is a passage 33 in which the reduced portion 21 of the spindle lies. The inner portion of the passage and about two-thirds of its length is provided with a first portion 34 formed as shown in FIG. 4; that is to say, the surface is provided with undulations. These undulations are of generally wave form and consist of moderate-slope surfaces 35 arranged alternately with steep-slope surfaces 36. Each pair of moderate-slope surface 35 and steep-slope surface 36 forms a crest 37 which is relatively close to the surface of the reduced portion 21 of the spindle. The outer end of the passage 33 (extending about one-third of its length) is occupied by a second portion 38 which is cylindrical and which is spaced from the surface of the reduced portion 21 of the spindle by an amount approximately the same as the distance from each of the crests 37 to that same surface. At the outer end, the passage 33 opens into a counterbore 39 having a slot 41 in its bottom portion extending downwardly to the outer periphery of the bearing block. The same construction of first portion with undulating surfaces and second portion with a cylindrical surface occupies the passage through the bearing block 25 in which the reduced portion 19 of the spindle lies. This passage terminates at its outer end in a counterbore 42 from which a slot 43 extends to the outer periphery of the bearing block.

The collector ring 32 is provided with an internal peripheral groove 44 facing toward the surface of the center portion 18 of the spindle and a radial passage 45 extends from this groove to the outer periphery. Similarly, the ring 31 is provided with an internal groove 46 from which a passage 47 extends radially to the outer periphery. Overlying the seal plate 29 is a cover 48 to form a chamber 49 between the two elements. Similarly, the seal plate 28 is provided with a cover 51 which defines with the seal plate a chamber 52.

Referring to FIGS. 5 and 6, a conduit 53 is connected to a source of pressure fluid. In a practical use of the invention, the fluid is water at a pressure of 200 p.s.i. The conduit is connected through the housing 15 by a horizontal passage 54 to a vertical passage 55. This passage connects to a horizontal passage 56 which extends through the entire length of the housing. At the pulley end of the housing a small passage 57 extends radially inwardly to an external annular groove 58 fromed in the outer surface of the bearing block 27. From this groove a passage 59 extends radially inwardly and toward the inner end of the bearing block to connect to a groove 61 formed on the spindle 11 between the center portion 18 and the reduced portion 21. At the other end of the housing (adjacent the abrasive wheel 12) a passage 62 extends radially inwardly from the passage 56 to connect to an external groove 63 formed in the outer surface of the bearing block 25. A passage 64 extends radially inwardly and toward the inner end of the bearing block to a groove 65 formed on the spindle 11 between the center portion 18 and the reduced portion 19.

The bottom part of the housing 15 is provided with a drain conduit 66 which is connected by a pair of vertical passages 67 to a pair of horizontal passages 68 extending lengthwise of the housing and closed at their ends by the seal plates 29 and 28. The passages 68 are connected to the slot 43 draining the chamber 42, to the passage 47 draining the groove 46, to the passage 45 draining the groove 44, and to the slot 41 draining the chamber 39.

Referring to FIG. 2, an air port 69 enters the side of the housing 15 and is connected to an elongated horizontal passage 71 which extends lengthwise of the housing and is closed at its ends by the seal plates 28 and 29. A small passage 72 extends radially inwardly in the central portion of the passage 71 through the housing to the portion of the bore 17 occupied by the center portion 18 of the spindle. At the pulley end of the housing, the end of the passage 71 is connected by a passage 73 through the seal plate 29 to the chamber 49. Similarly, at the other end, the passage 71 is connected by a passage 74 through the seal plate 28 to the chamber 52.

The operation of the apparatus will now be readily understood in view of the above description. Power is applied to the spindle 11 by means of the pulley 23 and this serves to rotate not only the main portion 14 of the spindle but also the outer portion 13 which carries the abrasive wheel 12. In a griding operation, for instance, the abrasive wheel 12 will be subjected to large radial forces which will be felt in the bearing surfaces of the wheelhead. The pressure fluid is passed from the conduit 53 through the horizontal passage 54 and up the vertical passage 55 to the horizontal passage 56. From there it passes through the passages 62 and 57 into the grooves 58 and 63 in the bearing blocks 27 and 25, respectively. The oil passes through the passage 59 into the chamber surrounding the groove 61 in the spindle. This chamber, incidentally, is defined by the facing radial surfaces of the center portion 18 and the reduced portion 21 of the spindle as well as by the bearing block 27 and the ring 32. The fluid passes through the passage 33 between the bearing block 27 and the reduced portion 21 of the spindle passing first into the first portion 34. When the spindle is first starting up and is still operating at low speed, the flow of fluid through both the first portion and the second portion acts in the same manner as a hydrostatic bearing. As the speed builds up, however, the rotation of the spindle in the couterclockwise manner shown in FIG. 4 causes a hydrodynamic wedge to be built up by the carrying of the fluid into the reduced portion between the moderately-sloped surface 34 and the cylindrical surface of the spindle. This means that very high hydrodynamic pressures are developed all around the spindle in the area of the crests 37. Oil then flows into the space between the second portion 38 of the passage 33 and the cylindrical surface of the spindle and from there into the counterbore 39. From there the fluid passes downwardly through the slot 41 into the passages 68 from which it flows down the vertical passages 67 to the drain conduit 66. The fluid entering the bearing block 25 by means of the passage 62 and the groove 63 flows through the passage 64 into the groove 65 and then flows radially outwardly through the passage in the bearing block, so that the block is subjected to hydrodynamic forces as well as hydrostatic forces. The oil flows through this bearing to the chamber 42 from which it drains through the slot 43 into the passages 68 and the drain conduit 66.

The air entering the system through the air port 69 passes to the passage 71 and through the passage 72 into the small space surrounding the center portion 18 of the spindle. This air flows around the spindle and then flows axially. The flow takes place with considerable turbulence which produces a cooling effect on the heavy mass of metal in the center portion of the spindle. The air flows axially and arrives at the groove 44 in the ring 32 where it meets oil from the groove 61 flowing in the opposite direction. The air and fluid mix and pass through the passage 44 downwardly into the passage 68 and to the drain conduit 66. The same procedure takes place at the other end of the spindle with the air from the center portion of the housing arriving at the groove 46 and mixing with the oil from the groove 65; the mixture is drained through the passage 47 to the passage 68 and the drain conduit 66. The air flowing from the passage 71 through the passage 73 to the chamber 49 (between the seal plate 29 and the cover 48) flows in two directions along the spindle; in one direction it goes into atmosphere around the gap between the cover 48 and the spindle surface, and in the other direction, it passes through the small gap between the seal plate 29 and the spindle and enters the chamber 39 where it mixes with the fluid and is carried into the drain conduit 66. The same thing is happening at the other end of the housing where the air from the passage 71 flows through the passage 74 to the chamber 52 between the cover 51 and the seal plate 28. This air also serves to seal the wheelhead and flows inwardly into the chamber 42, mixes with the fluid, and is carried to the drain conduit 66.

It can be seen, then, that by use of the present construction the fluid in the bearings operates in a hydrostatic manner at slow speeds and prevents scoring and absorption of power by the bearings. At high speed, a hydro-dynamic film develops because of the undulations in the first portion of the passage through the bearing block and the higher the speed the greater the centering action on the spindle. At high speed, the spindle becomes even stiffer; that is to say, it is less subject to radial movement in the bearings due to radial forces produced, for instance, by grinding forces on the abrasive wheel 12. At the same time, the air not only cools the spindle and obviates difficulties with changes of clearance due to thermal expansion and contraction of the metal parts, but also assists in keeping the fluid cool so that its viscosity does not change. In addition to cooling, the air serves to seal the ends of the spindle and prevent the leakage of oil in the area of the wheelhead. All of these functions are accomplished with an inexpensive construction.

If desired, a slightly higher pressure of oil can make iteself felt in the groove 61 against the end surface of the central portion of the spindle. The spindle acts like a piston and is thrown against the inwardly-directed radial surface 75 of the bearing block 25. For that purpose, in the preferred embodiment, the surface 75 is ground with a number of slight undulations to provide for a hydro-dynamic thrust bearing in that area; that is to say, a hydro-dynamic film will develop between the surface 75 of the bearing block 25 and the radial shoulder or surface of the central portion 18 of the spindle which faces and engages this surface.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A bearing for high-speed operation, comprising
   (a) a spindle having two spaced cylindrical portions,
   (b) a bearing block associated with each portion,
   (c) a passage through the block in which the said portion of the spindle lies, the passage being formed as first and second non-coextensive portions, the first portion having an undulating surface facing the cylindrical portion of the spindle, the second portion having a cylindrical surface which is concentric with and lies relatively close to the cylindrical portion of the spindle,
   (d) and means providing fluid under pressure to flow seriatim through the gap between the cylindrical portion of the spindle and the first and the second portion of the passage in the bearing block.

2. A bearing as recited in claim 1, wherein the spindle is provided with a central portion lying between the cylindrical portions, the central portion being of cylindrical form of substantially larger diameter than the diameter of the first-mentioned cylindrical portions.

3. A bearing as recited in claim 2, wherein means is provided to supply a flow of cooling fluid around the said center portion of the spindle.

4. A bearing as recited in claim 1, wherein the undulations are of generally wave form consisting of alternate moderate-sloped and steep-sloped surfaces, the intersection of each pair of moderate-sloped and steep-sloped surfaces forming a crest which lies substantially the same distance from the surface of the cylindrical portion of the spindle as the cylindrical surface of the second portion of the passage in the bearing block.

5. A bearing as recited in claim 4, wherein the moderate-sloped surfaces all face toward the oncoming surface of the rotating spindle to form a hydro-dynamic wedge to produce areas of intense fluid pressure between the said crests and the surface of the cylindrical portion of the spindle.

6. A bearing as recited in claim 5, wherein each moderate-sloped surface is a segment of a right circular cylinder whose axis is displaced from the axis of the spindle in the direction of the surface.

7. A bearing as recited in claim 1, wherein means is provided to drain the fluid after it has passed through the first and second portions.

8. A bearing as recited in claim 3, wherein the cooling fluid is air and wherein the fluid is conveyed to positions in the bearing where the air and pressure fluid confront one another, mix together, and are led to drain.

References Cited

UNITED STATES PATENTS

| | | | |
|---|---|---|---|
| 2,023,764 | 12/1935 | Howarth | 308—122 XR |
| 2,315,674 | 4/1943 | Tichvinsky et al. | 308—76 |
| 2,423,973 | 7/1947 | Halford | 308—77 XR |
| 2,486,227 | 10/1949 | Tydeman | 308—122 |
| 2,811,109 | 10/1957 | Brill et al. | 308—122 XR |
| 3,104,921 | 9/1963 | Newcomer | 308—122 |

FOREIGN PATENTS 514,555   11/1920   France.

MARTIN P. SCHWADRON, *Primary Examiner.*

ROBERT R. BUNEVICH, *Examiner.*